United States Patent
Nakatani

(10) Patent No.: US 8,508,794 B2
(45) Date of Patent: Aug. 13, 2013

(54) IMAGE FORMING USING WARM AND COLD BLACK TONE INKS

(75) Inventor: Akihiko Nakatani, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 809 days.

(21) Appl. No.: 12/632,530

(22) Filed: Dec. 7, 2009

(65) Prior Publication Data

US 2010/0157336 A1 Jun. 24, 2010

(30) Foreign Application Priority Data

Dec. 22, 2008 (JP) .................................. 2008-326584

(51) Int. Cl.
*H04N 1/60* (2006.01)

(52) U.S. Cl.
USPC ............................ 358/1.9; 358/1.13; 358/501

(58) Field of Classification Search
USPC ................ 358/1.1, 1.9, 3.01, 3.21, 1.13, 518, 358/521, 501; 382/162, 167; 347/43
See application file for complete search history.

(56) References Cited

U.S. PATENT DOCUMENTS

| | | | |
|---|---|---|---|
| 6,336,705 B1 | 1/2002 | Torigoe | |
| 6,359,703 B1 * | 3/2002 | Yabe | 358/1.9 |
| 7,636,178 B2 | 12/2009 | Nakatani et al. | |
| 2006/0061785 A1 | 3/2006 | Nagoshi et al. | |
| 2008/0055680 A1 * | 3/2008 | Nakamura et al. | 358/518 |

FOREIGN PATENT DOCUMENTS

| | | |
|---|---|---|
| JP | 2000-198227 | 7/2000 |
| JP | 2002-337323 | 11/2002 |

OTHER PUBLICATIONS

U.S. Appl. No. 12/611,768, filed Nov. 3, 2009. Applicants: Akihiko Nakatani, et al.

* cited by examiner

*Primary Examiner* — Thomas D Lee
(74) *Attorney, Agent, or Firm* — Fitzpatrick, Cella, Harper & Scinto

(57) ABSTRACT

An image forming apparatus sets one of a plurality of modes including a monochrome mode of forming a monochrome image, converts a multivalued luminance signal into signal values of color material amounts to be used to form the image and forms the image using color materials based on the signal values. The color materials used in the forming when the monochrome mode is set include an achromatic color material and at least two auxiliary color materials which have hues opposite to each other and a chroma larger than that of the achromatic color material.

8 Claims, 13 Drawing Sheets

IMAGE FORMING USING WARM AND COLD BLACK TONE INKS

BACKGROUND OF THE INVENTION

1. Field of the Invention

The present invention relates to an image forming method and image forming system for forming an image.

2. Description of the Related Art

As an image processing apparatus for printing and outputting an image, an inkjet printer which uses a plurality of inks as color materials is widely known. A printer of electrophotographic scheme or the like is also known, which uses toners as color materials. These image forming apparatuses express various colors by subtractive color mixture using three color materials of cyan (C), magenta (M), and yellow (Y) or four color materials including black (K), thereby printing.

In this kind of printing (image formation), when printing is performed based on signal values that decide the color material amounts of C, M, Y, and the like, faithful reproduction of the colors intended by the signal values fails in not a few cases. For example, if the size of dots formed by the color materials on a printing medium such as a paper sheet slightly varies, the colors of a printed image formed from dot aggregations are observed with a subtle color shift. This occurs when, for example, the amount (volume) of discharged ink droplets slightly changes due to the individual difference of the printhead that discharges inks, or the size of latent dots formed on the photosensitive member of an image forming apparatus of electrophotographic scheme slightly changes. The small change in the dot size can also occur depending on the relationship between the type of a printing medium in use and the properties of color materials such as inks or toners. The size of dots to be formed can also change because of aging of the image forming apparatuses.

The above-described phenomenon in which the colors of an actual printed image are expressed with a shift from colors (position coordinates) intended by the color material signals in the color space can take place in many image forming apparatuses. In this specification, this phenomenon will be referred to as a "color shift".

So-called calibration is conventionally known as a technique for coping with color shift. For example, after a target printer prints a patch, the color material amounts are adjusted by changing or generating tables for color conversion and γ correction based on the colorimetry result, thereby suppressing the color shift. In addition, the volume of ink droplets discharged from each printhead is measured, and image processing is changed based on it, thereby adjusting the color material amounts.

However, a color shift in, for example, a monochrome image expressed by achromatic colors such as black and gray is relatively hard to adjust. Conventionally, gray is often expressed by superimposing the three basic colors C, M, and Y in almost the same amount especially in a low density portion (Japanese Patent Laid-Open No. 2000-198227). In this case, a subtle variation in the amount of each color material causes an imbalance of the three colors and changes the hue relatively largely. For this reason, color material adjustment itself becomes difficult. Additionally, for the same reason, a slight change in the size of formed dots relatively largely changes the color. Since a color shift of gray means that a chromatic color faintly tints the achromatic color, the color shift is observed conspicuously.

FIG. 12 is a graph showing details of a color conversion lookup table (LUT) described in Japanese Patent Laid-Open No. 2000-198227, which is to be used to print a gray image. The abscissa represents density levels (density values) 0 to 255 expressed by, for example, 8-bit RGB input data for colors on the gray axis of the color space. The ordinate represents the output signal values (0 to 255) of the respective ink colors, that is, ink amounts to express the density values. As shown in FIG. 12, gray is expressed by three colors C, M, and Y from the lower density region to the medium density region. That is, the output values of three color inks shown in FIG. 12 are defined to express gray without any color shift in a predetermined color space. When the input density level roughly exceeds 11, use of black ink (K) starts. At the maximum density level, the output signal value is approximately 128.

FIG. 13 is a graph showing another example of the conventional color conversion LUT. This graph illustrates the ink amounts of the respective colors to express colors on the gray axis of the color space, like FIG. 12. FIG. 13 shows an example of a color conversion LUT when using light cyan (lc) and light magenta (lm) inks which contain colorants such as dyes in low concentration, in addition to cyan (C) and magenta (M) inks.

More specifically, in the recent field of inkjet printers, high-quality images comparable to silver halide photos are demanded. In this case, one of serious obstacles is graininess a printed image gives to an observer. The graininess is a kind of rough appearance an observer perceives when dots formed on a printing medium are so noticeable that he/she can visually recognize them. To reduce the graininess, a plurality of kinds of inks containing colorants in different concentrations are used as inks of the same color to change the print density per droplet as described above.

As shown in FIG. 13, in the low density region, gray is expressed using three color inks lc, lm, and Y. In a process where the density gradually rises from the low density region to the higher density region, dots are formed discretely. Hence, the graininess is reduced by using inks of lower densities. In this example as well, the output values of the three color inks are defined to express gray without any color shift in a predetermined color space. Near the middle density region, the output values of lm and lc are almost maximized. Higher densities can hardly be expressed by combining these inks. On the other hand, in this density region, the surface of the printing medium is filled with many dots. Hence, graininess of single dots is unnoticeable. From near this region, C, M, and K are gradually added to increase the density while reducing the graininess. Simultaneously, the output values of lc, lm, and Y gradually decrease. Finally, the output value of K becomes larger than those of the remaining inks so that black or gray with satisfactory tonality can be expressed.

In the above-described ink amount deciding methods shown in FIGS. 12 and 13, however, color shift adjustment in a gray or black monochrome image is difficult, and the color shift is noticeable, as described above.

Japanese Patent Laid-Open No. 2000-198227 describes a mode to print black characters and the like in which colors on the gray axis are expressed using a black (K) ink in all regions from the low density region to the high density region. If the graininess need not particularly be taken into consideration, gray or black can be expressed using the K ink in all density regions. This makes it possible to suppress a color shift caused by imbalance in expressing, for example, gray by three colors C, M, and Y.

In this case, however, a color shift may occur, which adds an unintended tint to a monochrome image depending on the property of K ink itself or the relationship between K ink and a printing medium.

Japanese Patent Laid-Open No. 2000-198227 has not suggested that the K ink should be used in all density regions for colors except those on the gray axis. In the monochrome photos, an image is sometimes required to be tinted to some extent to express a completely neutral tone (to be referred to as a pure black tone hereinafter), bluish black (to be referred to as a cold black tone hereinafter), or yellowish black (to be referred to as a warm black tone hereinafter).

However, according to Japanese Patent Laid-Open No. 2000-198227, it is impossible to meet the requirement for printing a variety of monochrome images complying with the user tastes. Properly speaking, it is preferable to perform appropriate color conversion processing for all monochrome photo tones (warm black tone, pure black tone, and cold black tone) and print a monochrome image without any color shift. The technique described in Japanese Patent Laid-Open No. 2000-198227, which uses the K ink in all density regions for a pure black tone color, cannot obviously meet the requirement by itself.

For a recent image forming apparatus such as an inkjet printer, a technique of printing by discharging smaller ink droplets has been developed to obtain higher image quality equal to that of a silver halide photo. When a printed image is formed from such relatively small dots, a "color shift" in printing a monochrome image further poses a problem.

More specifically, when ink droplets to be discharged become smaller, a printed image is more seriously affected by a small variation between printheads or a variation in the discharge amount between nozzles of the printhead generated upon production of printheads, or a faint change in the discharge amount depending on the use frequency of the printhead. Each of small dots formed by the small ink droplets original has a small area factor, that is, a small area or ratio of coverage on the surface of a printing medium. Hence, the above-described variation in the discharge amount or the like relatively largely changes the area factor on the entire image, resulting in larger variation in gray.

If the shift amount or direction of the "color shift" changes relatively largely, an "undesirable color change" may occur, which is a phenomenon of the color shift and largely shifts the development. Especially, the "undesirable color change" readily occurs in the process where the inks used dominantly gradually change from the low density region to the higher density region, as described above with reference to FIG. 13.

When using K ink in all density regions for a pure black tone color, yellow ink that is a chromatic color ink is added in a very small amount as a toning component for a warm black tone. For a cold black tone, cyan ink (or light cyan ink) and magenta ink (or light magenta ink) that are chromatic color inks are added in a very small amount as toning components. There can be a technique of enabling color adjustment of a monochrome photo by gradating these colors.

However, when adjusting from the warm black tone to the cold black tone, ink use becomes discontinuous from the pure black tone to both sides. Hence, it may be difficult for a user who has viewed the warm and cold black tone colors to predict the pure black tone color.

SUMMARY OF THE INVENTION

An aspect of the present invention is to eliminate the above-mentioned problems with the conventional technology.

The present invention provides an image forming method and image forming system which allow to print a satisfactory monochrome image by suppressing color shifts in correspondence with color adjustment of a region including a warm black tone, pure black tone, and cold black tone in a monochrome photo print mode.

The present invention in its first aspect provides an image forming method of forming an image, comprising the steps of: setting one of a plurality of modes including a monochrome mode of forming a monochrome image; converting a multivalued luminance signal into signal values of color material amounts to be used to form the image; and forming the image using color materials based on the signal values, wherein the color materials used in the forming step when the monochrome mode is set in the setting step include an achromatic color material and at least two auxiliary color materials which have hues opposite to each other and a chroma larger than that of the achromatic color material.

The present invention in its second aspect provides an image forming system for forming an image, comprising: a setting unit configured to set one of a plurality of modes including a monochrome mode of forming a monochrome image; an image processing unit configured to convert a multivalued luminance signal into signal values of color material amounts to be used to form the image; and an image forming unit configured to form the image using color materials based on the signal values, wherein when the monochrome mode is set by the setting unit, the image forming unit forms the image using an achromatic color material and at least two auxiliary color materials which have hues opposite to each other and a chroma larger than that of the achromatic color material.

The above-described arrangement can suppress a color shift in the monochrome photo mode. Especially, a monochrome image whose color shift is sensitively perceived by an appreciator can be printed without any color shift even in the low density region of an image.

Further features of the present invention will become apparent from the following description of exemplary embodiments with reference to the attached drawings.

DESCRIPTION OF THE EMBODIMENTS

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

First Embodiment

Figure 1:
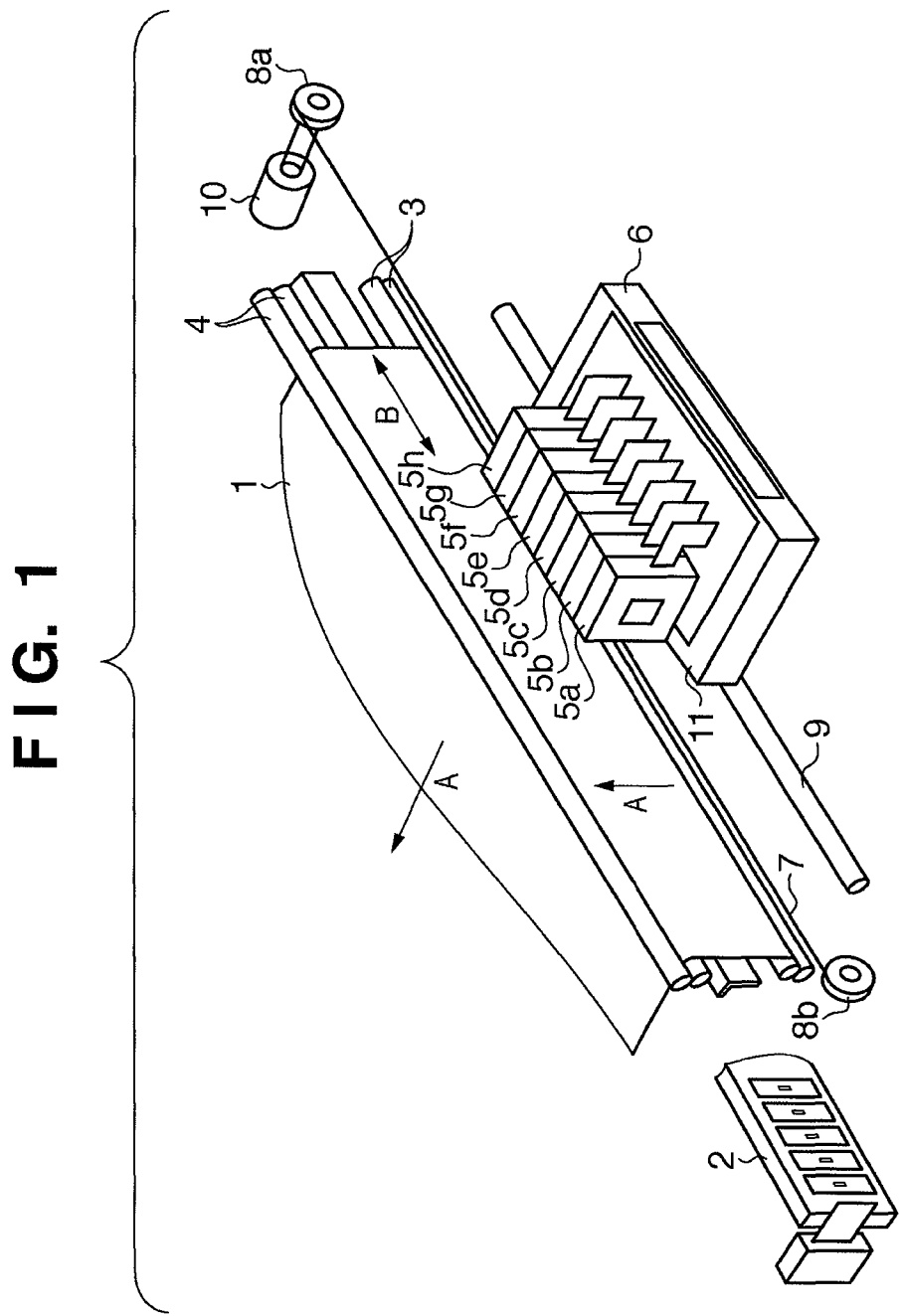
FIG. 1 is a perspective view showing the main arrangement of an inkjet printer according to an embodiment of the present invention.

FIG. 1 is a perspective view showing the main arrangement of an inkjet printer according to an embodiment of the present invention. Referring to FIG. 1, reference numeral 1 denotes a printing medium such as a paper sheet or a plastic sheet. Before the start of printing, a plurality of printing medium 1 are stacked on a cassette (not shown) or the like. When printing starts, a feed roller (not shown) supplies the printing media into the apparatus main body one by one. A first conveyance roller pair 3 and a second conveyance roller pair 4 are arranged at a predetermined interval in almost the vertical direction. Each of the first conveyance roller pair 3 and the second conveyance roller pair 4 is driven and rotated by a corresponding stepping motor (not shown) so as to intermittently convey the printing medium 1 held in the roller pairs in the direction of an arrow A by a predetermined amount.

Ink tanks 5a to 5h store inks to be supplied to corresponding printheads 11. The ink tank 5a stores yellow ink (Y); the ink tank 5b, magenta ink (M); the ink tank 5c, cyan ink (C); the ink tank 5d, light magenta ink (lm); the ink tank 5e, light cyan ink (lc); and the ink tank 5f, black ink (K). The ink tank 5g and the ink tank 5h store warm black tone ink and cold black tone ink, respectively, which are features of the embodiments. In this embodiment, the warm black tone ink has color gamut in the upper right quadrant of the color reproduction Lab coordinate system. The cold black tone ink has color gamut in the lower left quadrant of the color reproduction Lab coordinate system. The warm black tone ink and cold black tone ink have a chroma larger than that of black ink serving as an achromatic color material and smaller than that of color gamut which is expressed by all combinations of achromatic color materials and chromatic color materials (C, M, and Y) without exceeding the ink acceptance allowance of a printing medium.

The printheads 11 corresponding to the ink tanks are connected to their front sides (on the printing medium side) via ink supply channels. The orifice surface of each printhead 11 where ink orifices are formed faces the printing medium 1 which is held by the first conveyance roller pair 3 and the second conveyance roller pair 4 and receives a predetermined tensile force. Note that the printheads 11 for discharging the above-described eight color inks may be separated for each color or integrated.

The printheads 11 and the ink tanks 5a to 5h are detachably attached to a carriage 6. A carriage motor 10 transfers its driving force to the carriage 6 via two pulleys 8a and 8b and a belt 7, thereby reciprocally moving the carriage 6 in the direction of an arrow B. At this time, a guide shaft 9 guides and supports the scan direction of the carriage 6.

A recovery unit 2 performs maintenance processing of the printheads 11. The printheads 11 move to the home position, as needed, where the recovery unit 2 is provided so that recovery processes such as preliminary discharge, suction recovery, and wiping are executed using the recovery unit 2.

To print, the carriage 6 moves in the direction of the arrow B at a predetermined speed. During this time, each printhead 11 discharges an ink droplet at an appropriate timing in accordance with a print signal. When the printheads 11 have ended print scanning of one cycle, the conveyance roller pairs 3 and 4 convey the printing medium 1 by a predetermined amount. Such print scanning and printing medium conveyance are repeated, thereby sequentially forming an image on the printing medium 1.

Figure 2:
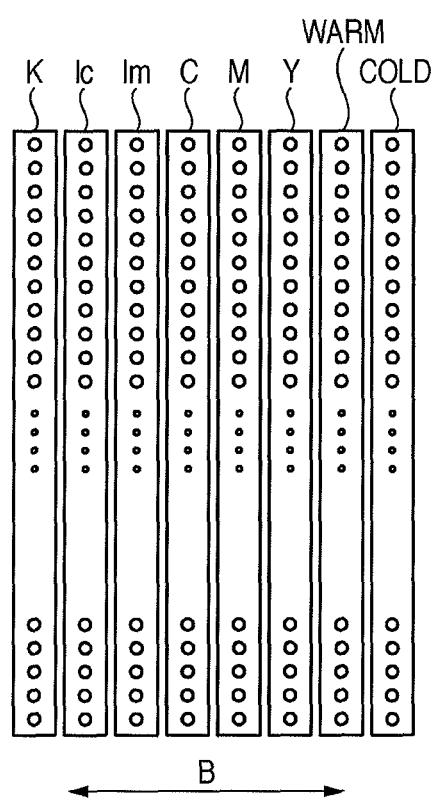
FIG. 2 is a view schematically showing the orifice surfaces of the printheads of respective color inks.

FIG. 2 is a view schematically showing the orifice surfaces of the printheads 11 of the respective color inks (K, lc, lm, C, M, Y, warm, and cold). The (orifice arrays of the) printheads are arranged at the same places as the ink tanks 5a to 5h in the direction of the arrow B, that is, print scanning direction, as shown in FIG. 2. The orifice array of each color ink includes 512 orifices which are arranged at a pitch of about 40 μm in the direction of the arrow A, that is, printing medium conveyance direction shown in FIG. 1. In this arrangement, when each printhead 11 performs print scanning of one cycle, an image having a resolution of 600 dpi (dots/inch: reference value) is formed on the printing medium 1.

In this embodiment, one orifice of each printhead discharges an ink droplet in about 2 ng (2 pl). In the printer of this embodiment, the ink amount of 2 ng "makes graininess almost negligible at a general distance of distinct vision when K ink is printed on a printing medium discretely".

More specifically, in this embodiment, settings are done to print a predetermined monochrome image using the warm black tone ink and cold black tone ink for not only the gray axis but also the whole gamut in all density regions, as will be described later with reference to FIGS. 7A to 7C and the like.

In this case, graininess in the low density region particularly causes a concern. However, especially for a monochrome photo, graininess or feeling of noise is culturally added on purpose in some cases. Hence, the ink amount of 2 ng does not pose any special problem on a printed image. Note that application of the present invention is not limited to the case in which such a very small ink droplet is used.

For example, even if a printed image exhibits graininess, it does not always pose a serious problem. Alternatively, the user may not care about the graininess but desire to suppress color shifts. In these cases, the present invention can effectively be applied to printing which mainly requires color shift suppression regardless of the amount of an ink droplet to be used.

Figure 3:
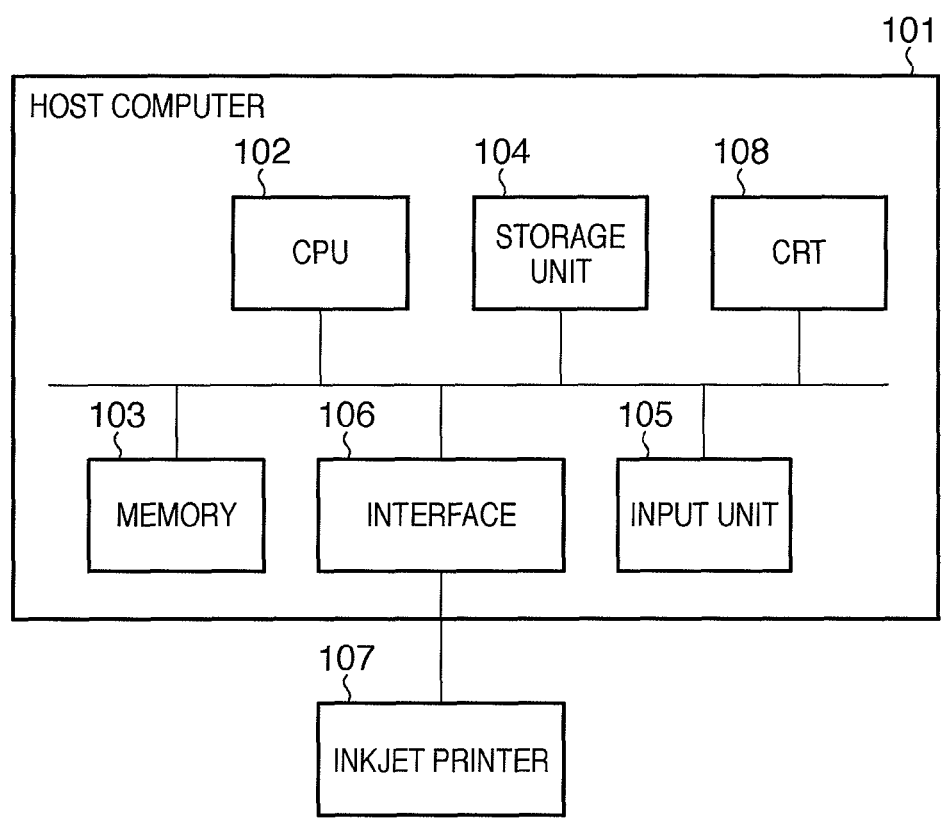
FIG. 3 is a block diagram showing a printing system including the inkjet printer and a host computer of the embodiment.

FIG. 3 is a block diagram showing an image forming system (printing system) according to the embodiment which includes the above-described inkjet printer of the embodiment and a computer corresponding to it.

A host computer 101 includes a CPU 102, memory 103, storage unit 104, input unit 105, CRT 108, and interface 106.

The CPU 102 executes programs stored in the storage unit 104 to perform overall processing associated with image processing and printing to be described later with reference to, for example, FIGS. 4 and 5. The memory 103 serves as a work area for image processing or an area to temporarily store image data. Note that the programs to be used to execute image data conversion processing and the like may be supplied from an external device (not shown) to the host computer 101. The user inputs various commands using the input unit 105 while confirming the contents on the CRT 108.

The host computer 101 is connected to an inkjet printer 107 via the interface 106. The CPU 102 causes the inkjet printer 107 to execute printing by transmitting print data obtained by image processing to it.

Figure 4:
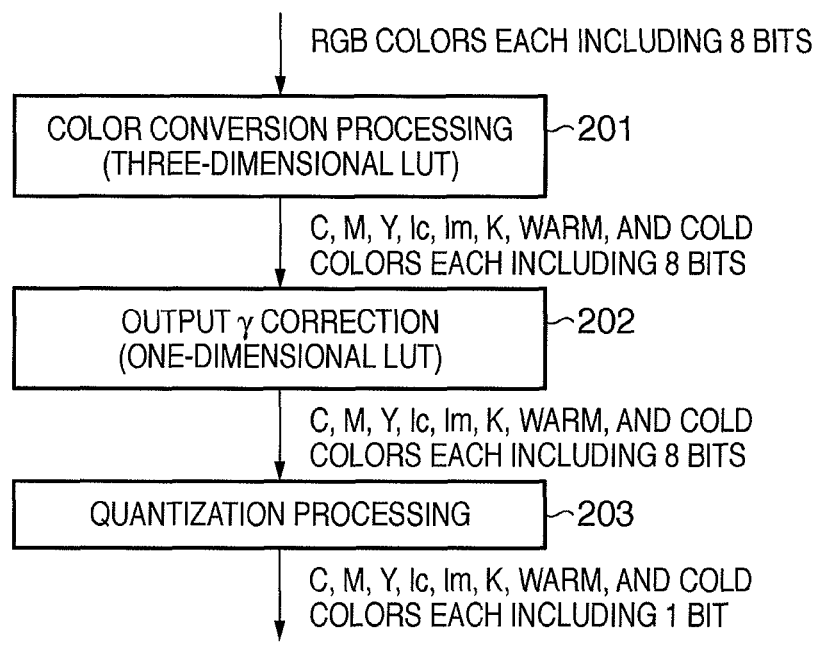
FIG. 4 is a block diagram showing the procedure of conversion from a luminance signal to a density signal by a CPU 102.
Figure 5:
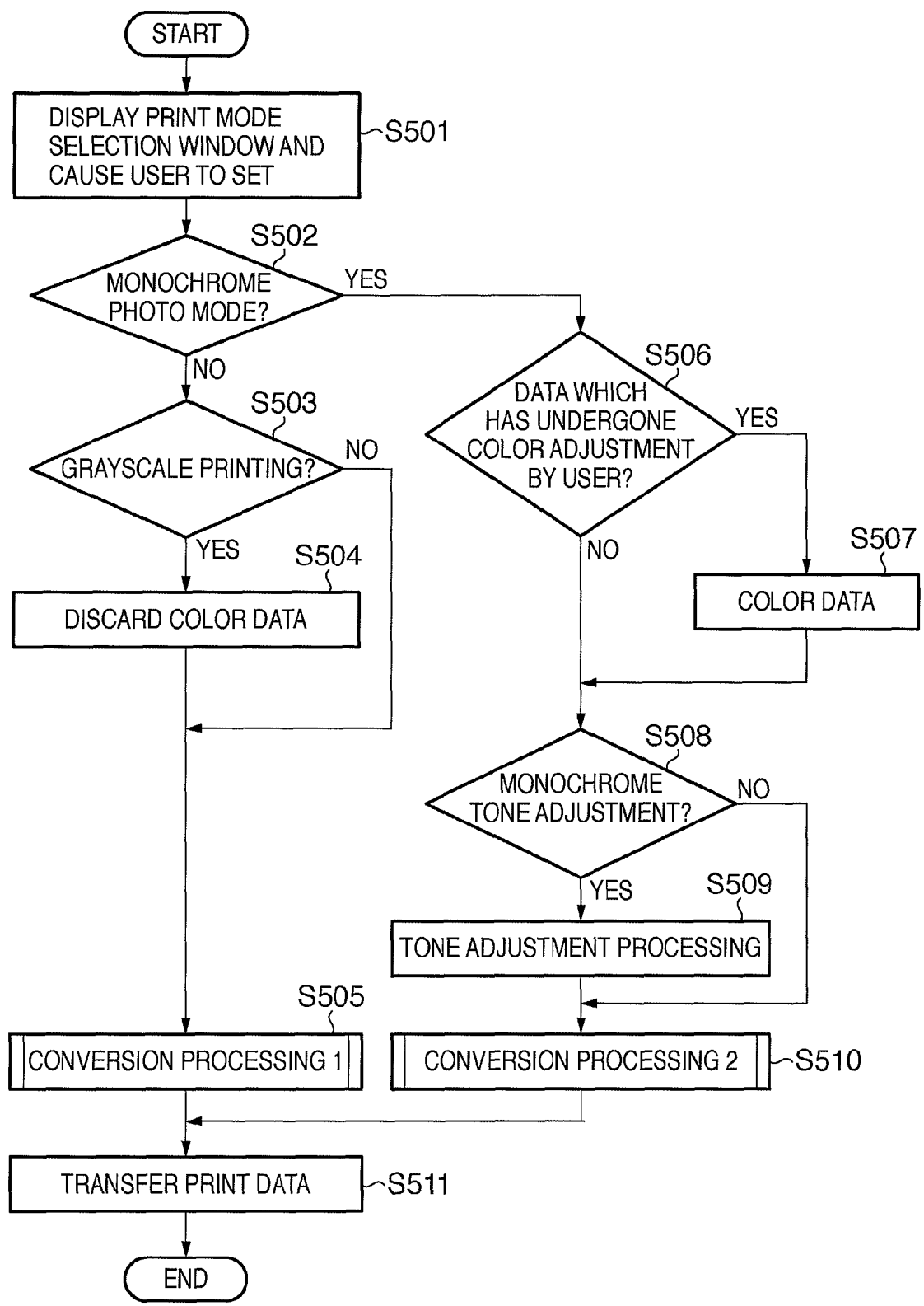
FIG. 5 is a flowchart illustrating the procedure of image processing including color conversion processing for ink amount decision in monochrome printing and associated processing.

FIG. 4 is a block diagram for explaining image processing (conversion from a luminance signal to a density signal) to be performed by the CPU 102 shown in FIG. 5. In this embodiment, image data represented by 8-bit RGB luminance signals (256 tones) is finally converted into print data of C, M, Y, lc, lm, K, warm black tone ink, and cold black tone ink each formed from 1-bit data to be used in the inkjet printer. In this case, R represents red; G, green; and B, blue. Additionally, C represents cyan; M, magenta; Y, yellow; lc, light cyan; lm, light magenta; and K, black.

The whole image processing corresponds to conversion processing in step S505 or S510 of FIG. 5 to be explained later.

As shown in FIG. 4, the RGB luminance signals each containing eight bits are first input to color conversion processing 201 and converted into C, M, Y, lc, lm, and K density signals. The conversion is done using a three-dimensional color conversion lookup table (LUT) and interpolation processing. More specifically, by looking up the LUT, the CPU 102 obtains the density values of C, M, Y, K, lc, and lm, and also those of the warm black tone ink and cold black tone ink if they are set, corresponding to the combination of the input RGB signal values.

The LUT holds only density values corresponding to specific discrete RGB data. Hence, the density values corresponding to the combination of the input RGB values are obtained by performing interpolation processing using a set of a plurality of density values which are held in correspondence with all RGB combinations expressed by 256 tones of each color. Note that the interpolation processing executed here is a known technique, and a detailed description thereof will be omitted. Each of the density signal values acquired by the color conversion processing 201 is expressed by eight bits, like the input values, and output as image data having 256 tone values (density values).

Next, conversion processing by output γ correction 202 is performed for the image data which has undergone the color conversion processing 201. In the output γ correction 202, correction is performed for each ink color such that that the optical densities to be finally expressed on the printing medium maintain linearity with respect to the input density signals. In this case, γ correction is performed by referring to a one-dimensional lookup table independently prepared for each color. The output signal from the output γ correction 202 is density value data containing eight bits for each color, like the input value.

Then, quantization processing 203 is executed for each 8-bit density value data output from the output γ correction 202. The inkjet printer of this embodiment uniformly discharges 2-ng ink droplets from the printhead. Hence, each pixel on the printing medium expresses the density value in two steps, that is, whether to print the 2-ng ink droplet or not.

In a region including a plurality of pixels and having an area to some extent, the density is macroscopically expressed by the number of pixels that form ink dots. This density expression method is generally called the area coverage modulation method. A printing apparatus using the area coverage modulation method requires quantization processing of converting multilevel data into binary data, as in this embodiment.

Several techniques are usable for the quantization processing, including known error diffusion and dithering. Image data containing one bit for each color, which is quantized by the quantization processing 203, is transferred to the inkjet printer so that a printing operation is performed.

In general, optimum conversion methods of the above-described color conversion processing 201, output γ correction 202, and quantization processing 203 change depending on the type of the printing medium, the type of the image to be printed, and the like. Especially, the lookup tables used in the color conversion processing 201 and the output γ correction 202 are commonly prepared for each type of the printing medium.

FIG. 5 is a flowchart illustrating the procedure of image processing by the host computer 101, including color conversion processing for ink amount (color material amount) decision in monochrome printing, and associated processing according to this embodiment.

This processing is activated in accordance with a user's print instruction on an application. First, the CPU 102 displays, on the CRT 108, a window to select a print mode (step S501).

Figure 6:
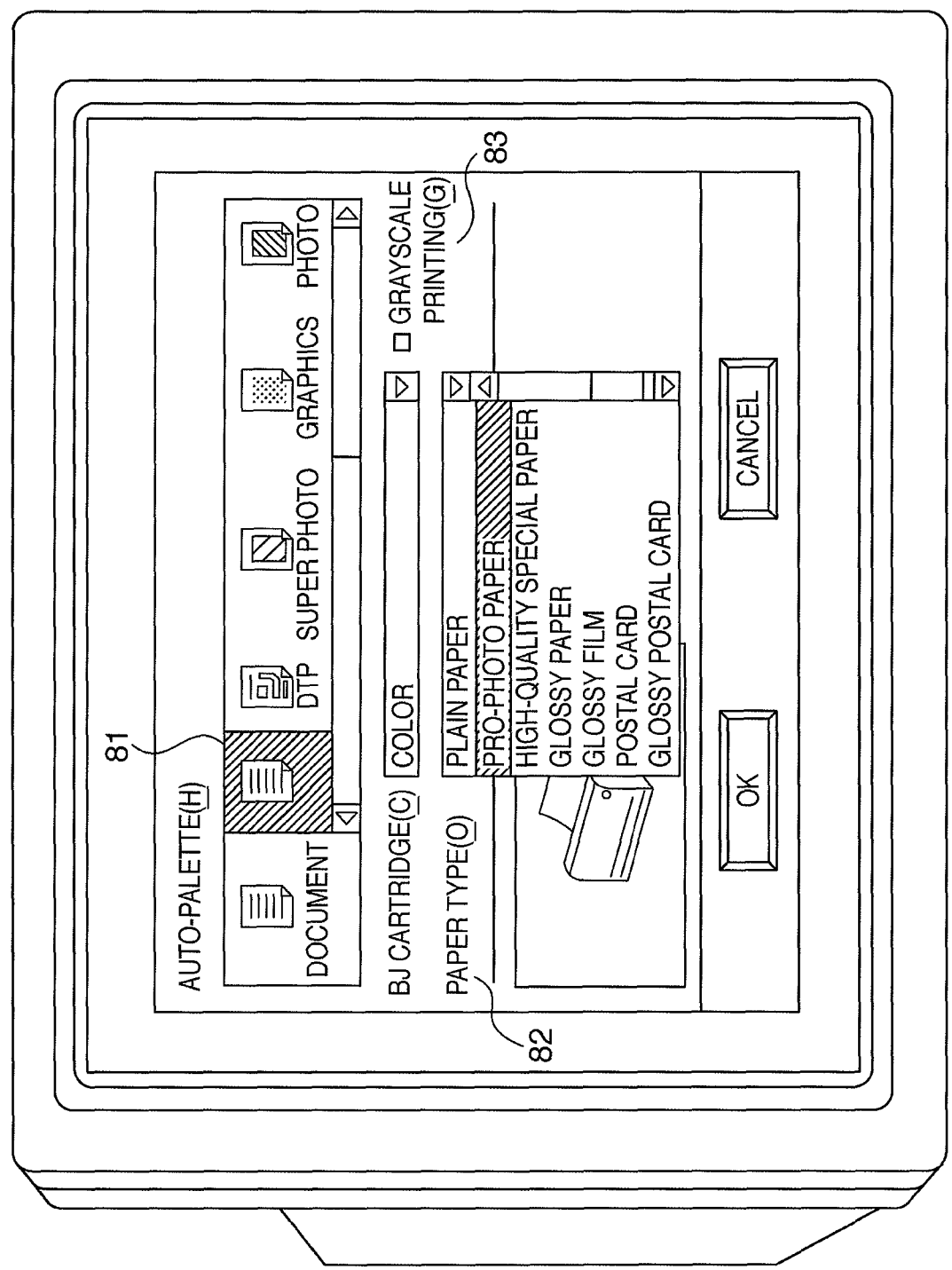
FIG. 6 is a view showing an example of a display window to select a print mode in the processing shown in FIG. 5.

FIG. 6 is a view showing an example of the display window. The inkjet printer of this embodiment can print on a plurality of types of printing media. An appropriate print mode is prepared for each printing medium. The user inputs several conditions on the window shown in FIG. 6, thereby setting or selecting the print mode.

In this embodiment, the user sets, on an auto-palette 81, the type of an image to be printed (e.g., whether to print a document or a photo). The user also sets, on a paper type 82, the type of a printing medium to be used for printing. The user can also mark a grayscale printing checkbox 83 to set monochrome printing of a desired image.

Referring back to FIG. 5, the CPU determines in step S502 whether the set print mode is the monochrome photo mode of the monochrome modes. In this embodiment, the "monochrome photo mode" is set by selecting grayscale printing on the checkbox 83 and selecting pro-photo paper on the paper type 82.

Note that when grayscale printing is selected on the checkbox 83, and paper other than pro-photo paper is selected on the paper type 82, a normal monochrome mode (grayscale printing) other than the "monochrome photo mode" is set.

If it is determined in step S502 that the monochrome photo mode is set, the process advances to step S506. In step S506, the CPU determines whether RGB image data to be printed is image data that has undergone color adjustment by the user. In this data, for example, the RGB values have slightly changed due to the color adjustment performed by the user.

The image data undergoes correction in step S507 so that color adjustment processing in step S509 or color conversion processing in step S510 to be described below can effectively act in printing an image like a monochrome photo. These processes make it possible to print an intended high-quality image like a monochrome photo. The determination in step S506 may be done based on a predetermined input via the user interface. This input may include a user input for discarding the color-adjusted image or color image. The determination may be done automatically under a predetermined determination condition.

If it is determined in step S506 that the image data has undergone color adjustment by the user, processing of discarding color components expressed by RGB is performed in step S507. More specifically, the RGB signals of the image data are converted into luminance signals of gray tones (R value=G value=B value). Let L be the luminance signal value of an achromatic color to be obtained. Using, for example, a conversion expression L=0.3R+0.6G+0.1B, RGB values are replaced with the L value, thereby performing the conversion. With this processing, color data is discarded while ensuring awareness of a kind of brightness.

Figure 10:
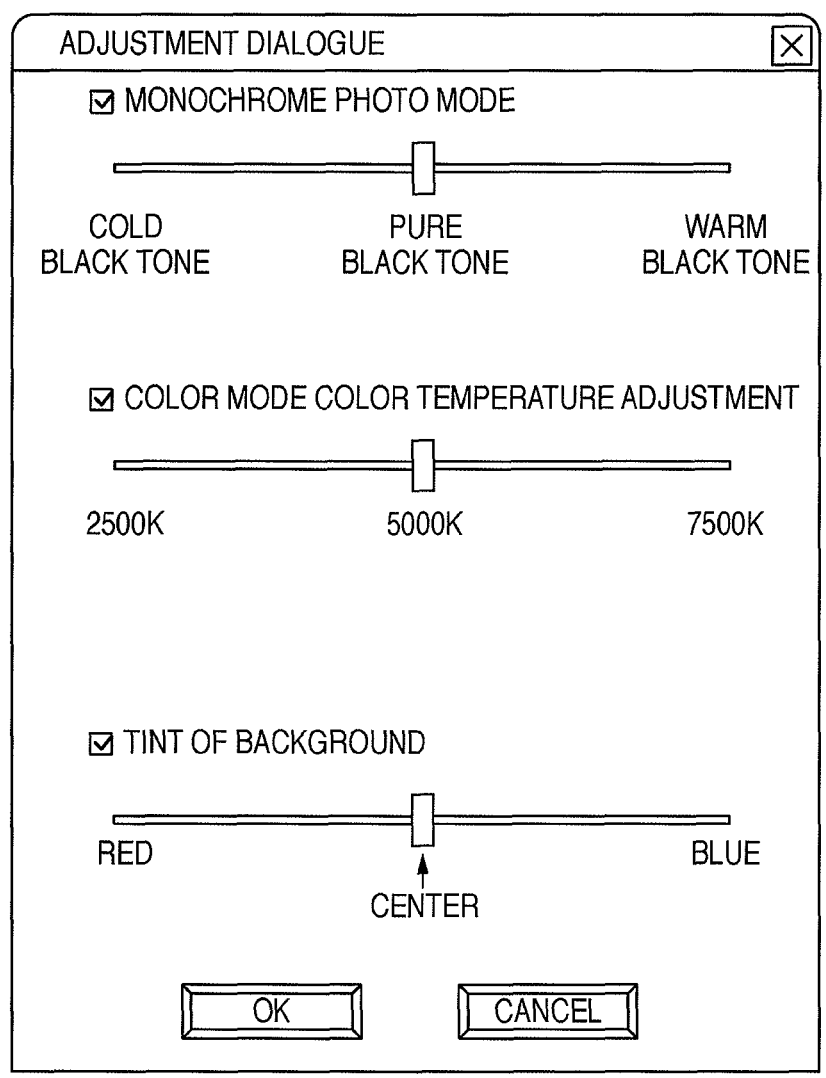
FIG. 10 is a view showing an example of a window including settings of a "monochrome photo mode"

In step S508, the CPU determines whether to execute color adjustment of the cold black tone or warm black tone of the monochrome photo image. This determination is done by opening a window shown in FIG. 10 and checking whether the "monochrome photo mode" checkbox has been marked. FIG. 10 illustrates a user interface window where the user can adjust the warm black tone, pure black tone, and cold black tone colors. The user can set the color adjustment using a slider shown at the uppermost position of FIG. 10.

Upon determining to perform the color adjustment processing, the tone is adjusted in step S509 in accordance with the slide amount of the slider shown in FIG. 10. More specifically, the L value obtained in step S507, or if the process in step S507 has not been performed, an L value that satisfies L=R=G=B is used.

For the warm black tone, the color adjustment processing is performed by obtaining RGB values using $$R=\text{INT}(255 \times (L/255)(1-m)) \quad (1)$$

$$G=\text{INT}(255 \times (L/255)(1+m)) \quad (2)$$

$$B=\text{INT}(255 \times (L/255)(1+m)) \quad (3)$$

where m is the tone adjustment coefficient corresponding to the amount of sliding of the slider (FIG. 10) by the user. For example, 0<m<0.5. With this adjustment processing, R-rich image data containing G and B of the same level is obtained.

On the other hand, for the cold black tone, the color adjustment processing is performed by obtaining RGB values using $$R=\text{INT}(255 \times (L/255)(1+m)) \quad (4)$$

$$G=\text{INT}(255 \times (L/255)(1+m)) \quad (5)$$

$$B=\text{INT}(255 \times (L/255)(1-m)) \quad (6)$$

where m is the tone adjustment coefficient corresponding to the slide amount, as described above. For example, 0<m<0.5. With this adjustment processing, B-rich image data containing R and G of the same level is obtained.

After the color adjustment or without the adjustment, the process directly advances to step S510 to execute conversion processing 2 unique to the monochrome photo mode.

Conversion processing 2 includes color conversion processing of this embodiment. In the color conversion processing, the lookup table dedicated to the monochrome photo mode is selected, and how to use inks is decided using the lookup table, as will be described later with reference to FIGS. 7A to 7C. This makes it possible to print an image like a monochrome photo without any color shift.

In this embodiment, as a characteristic feature of this color conversion processing, density value signals are generated such that the warm black tone ink and cold black tone ink serving as the auxiliary color materials are used in larger amounts than those of chromatic color inks in all density regions from the low density region to the high density region throughput the gamut (the region of the warm black tone, pure black tone, and cold black tone) including the achromatic color axis. Note that conversion processing 2 includes the series of image processes explained with reference to FIG. 4.

If it is determined in step S502 that the set mode is not the monochrome photo mode, the process advances to step S503. In step S503, the CPU determines whether a monochrome mode other than the "monochrome photo mode" is set.

More specifically, as described in step S502, it is determined whether the "grayscale printing" checkbox 83 has been marked on the user interface window shown in FIG. 6. Upon detecting the mark on the checkbox, the process advances to step S504 to convert the RGB image signals into gray tone (R=G=B) luminance signals, as in the process of step S507. After that, the process advances to step S505.

On the other hand, upon determining that the grayscale printing checkbox 83 has not been marked, the process directly advances to step S505.

In step S505, conversion processing 1 is executed for the image data. Conversion processing 1 also includes the series of image processes explained with reference to FIG. 4, like conversion processing 2. However, the color conversion processing is different from that of conversion processing 2.

If the process skips to step S505 without performing step S504, conversion processing 1 generates density value signals corresponding to the respective color inks necessary for printing a color image using a conventionally known color conversion processing table for a color mode.

Figure 13:
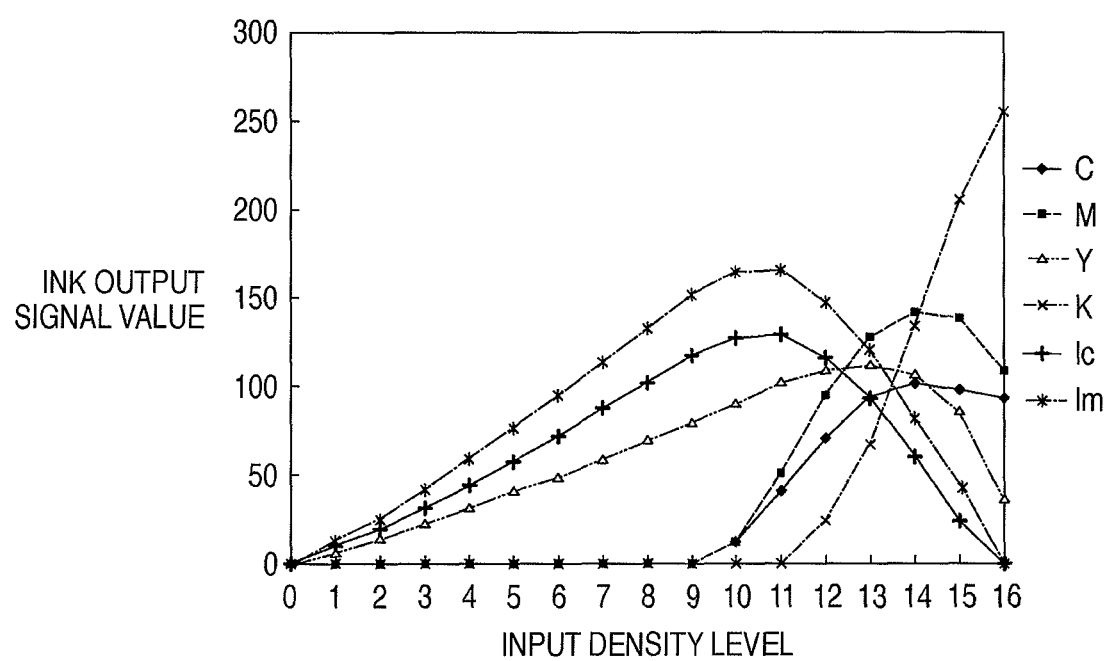
FIG. 13 is a graph for explaining another example of the conventional color conversion lookup.

If the process advances to step S505 via step S504, conversion processing 1 generates density value signals corresponding to the respective color inks necessary for printing a grayscale image including gray axis color conversion shown in FIG. 13 using the above-described known color conversion processing table for a color mode.

The image data that has undergone the conversion processing in step S505 or S510 is sent to the inkjet printer 107 as binary print data and used in the printing operation (step S511).

Note that in this embodiment, the monochrome photo mode is set only when the printing medium is pro-photo paper. Hence, conversion processing 2 executed in step S510 uses a processing method dedicated to pro-photo paper. On the other hand, conversion processing 1 executed in step S505 if it is determined that the set mode is not the monochrome photo mode can support a plurality of types of printing media.

More specifically, lookup tables which change depending on the printing medium are prepared for the color conversion processing and output γ correction. In conversion processing 1, conversion corresponding to each printing medium is performed. Especially, the above-described processing branches to two courses, as shown in FIG. 5, to compare the monochrome photo mode with other modes.

In this embodiment, the color conversion processing performs the processes of converting the luminance signal values into density signal values at once using a lookup table. The conversion processing executed in the color conversion processing includes a preprocess of converting the RGB gamut into the CMY gamut and a post-process of deciding the amounts of inks to be used to express the colors in the converted gamut.

In the preprocess, luminance-to-density conversion such as log conversion is performed to calculate CMY density values from the RGB luminance values, and the RGB gamut defined in a predetermined color space such as L*a*b* is converted into the CMY gamut.

In the post-process, the CMY density values are converted into density values associated with the amounts of C, M, Y, K, lc, and lm inks in accordance with the type of inks to be used in the printer and the property of the printing medium, thereby deciding the amounts of inks to be used to express the colors in the above-described converted gamut.

Luminance-to-density conversion that is the preprocess does not change depending on the type of the printing medium or the print mode. The lookup table of color conversion processing changes between the print modes because of the difference in the post-process. The tables shown in FIGS. 7A to 7C to be described below are used in the above-described post-process.

Figure 7A:
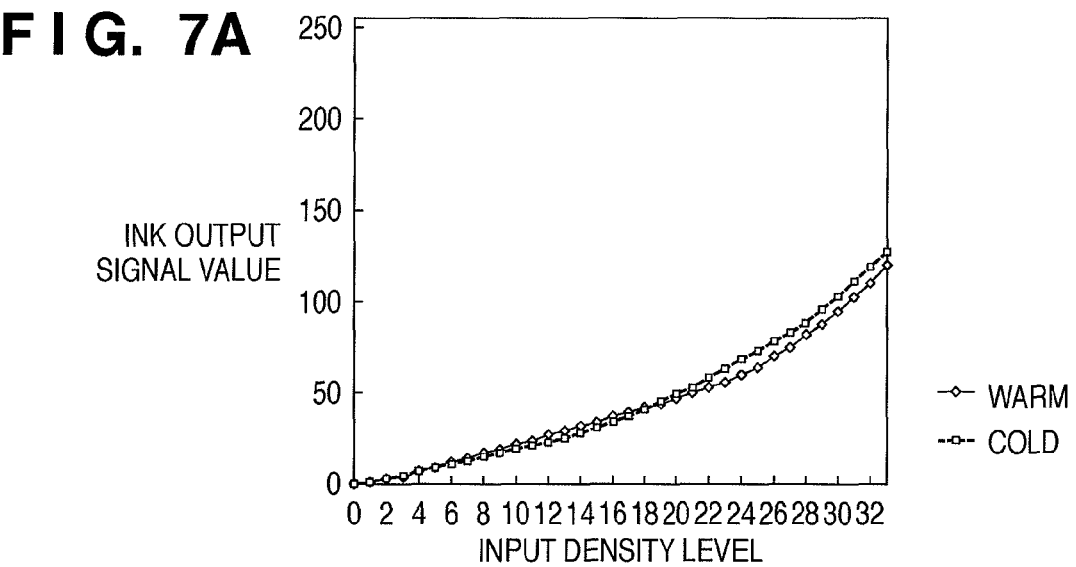
FIGS. 7A to 7C are graphs schematically showing lookup tables to be used in the post-process of color conversion processing in conversion processing 2 shown in FIG. 5.
Figure 7B:
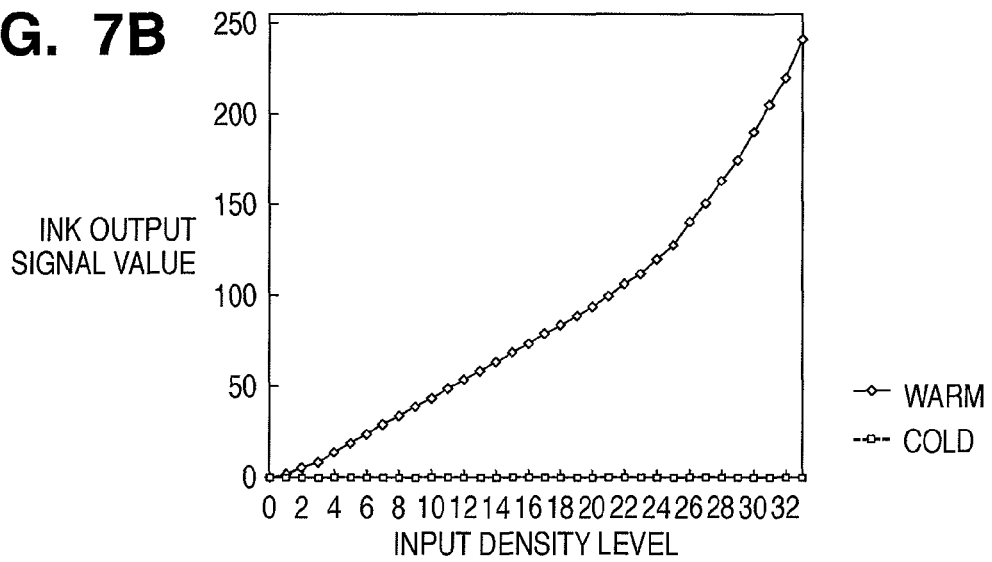
Figure 7C:
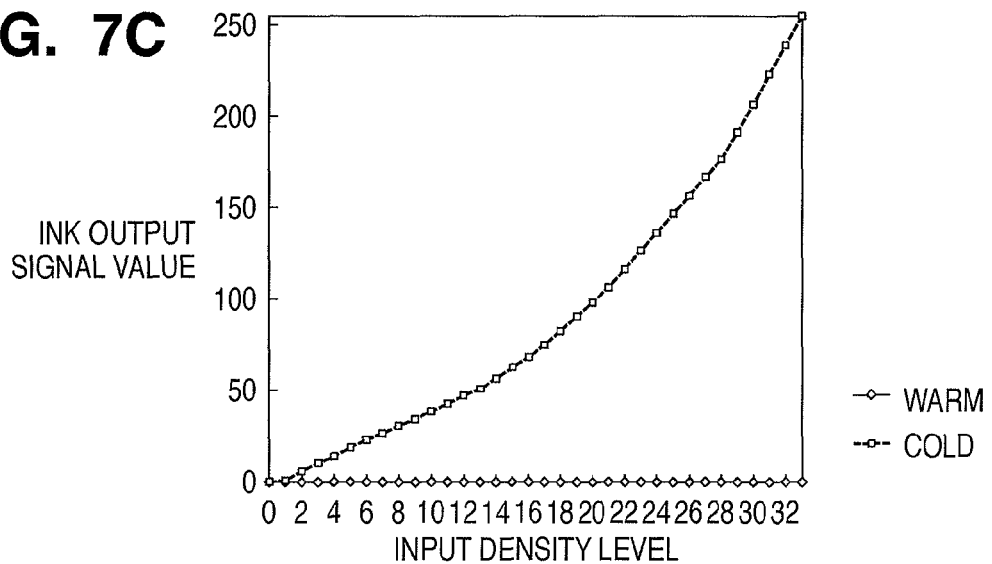

FIGS. 7A to 7C are graphs schematically showing the lookup tables (LUTs) to be used in the post-process of color conversion processing in conversion processing 2 shown in the monochrome photo print mode. FIG. 7A schematically shows the lookup table of the gray axis line (pure black tone line). FIG. 7B schematically shows the lookup table of the yellow line (to be referred to as a warm black tone line hereinafter). FIG. 7C schematically shows the lookup table of the blue line (to be referred to as a cold black tone line hereinafter).

The lookup tables schematically illustrated in FIGS. 7A to 7C are selected in accordance with the mode (warm black tone, pure black tone, or cold black tone) selected by the slider in FIG. 10.

In each of FIGS. 7A to 7C, the abscissa represents the lattice points on the line of the LUT. The lattice points are levels to be defined by the density values of the color materials (inks) after the above-described luminance-to-density conversion. The ordinate represents the density values of the color materials (inks), that is, the amounts of inks to be used to express the colors (of the lattice points) of the line in correspondence with the lattice points.

The gray axis line shown in FIG. 7A connects white and black lattice points on the LUT. The warm black tone line shown in FIG. 7B starts from white and reaches black via the warm black tone. This line passes through the maximum chroma point of the warm black tone hue in the gamut.

Like the warm black tone line, the line shown in FIG. 7C also starts from white and reaches black via the cold black tone. This line passes through the maximum chroma point of the cold black tone hue in the gamut.

Note that the ink amounts on the lines (lattice points) shown in FIGS. 7A to 7C are obtained based on, for example, the colorimetry result of a printed patch. The ink amounts at the lattice points except those on the lines are decided by interpolation processing.

Figure 9A:
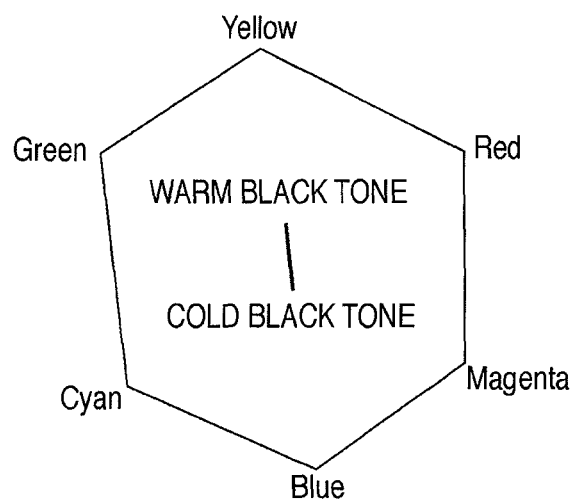
FIGS. 9A and 9B are views showing the gamut compared with that for color printing.
Figure 9B:
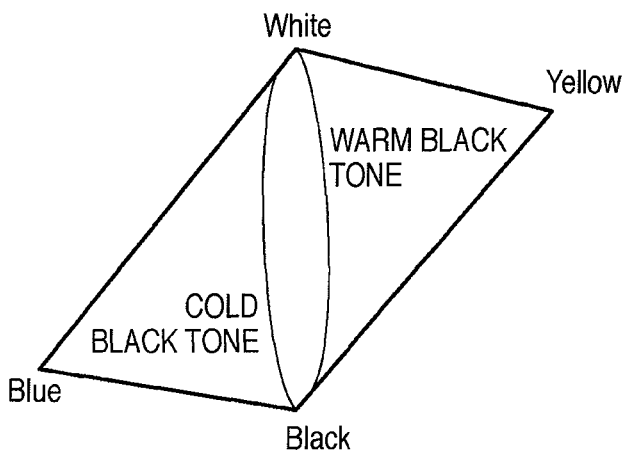

FIG. 9A is a view showing the gamut of this embodiment viewed from the upper side of the brightness (L*) axis and compared with that for color printing. As shown in FIG. 9A, the chroma (a* and b*) values in the gamut are much smaller than those in the gamut for color printing. FIG. 9B illustrates a cross section of the gamut.

The gamut of the line on each of the LUTs shown in FIGS. 7A to 7C is much smaller than that in conversion processing 1 (color printing), as shown in FIGS. 9A and 9B. Especially, there are no planes except for those, which are unnecessary for a monochrome photo, in the yellow and blue directions (to be referred to as warm black tone and cold black tone directions hereinafter).

The ink use based on conversion processing 2 greatly changes from that in the table of conversion processing 1. More specifically, in the monochrome photo mode, a monochrome image by gray or black is basically obtained even when the tone adjustment in step S509 has been executed. In the gamut, the chroma exists only in the warm black tone and cold black tone directions around the pure black tone line, as shown in FIG. 9A. That is, the gamut is a plane gamut centered on the gray axis (achromatic axis).

According to the LUTs of the embodiment shown in FIGS. 7A to 7C, the auxiliary color materials are used in all regions from the highlight region with a low density to the high density region with a high density even in the gamuts (FIGS. 7B and 7C) other than the gray axis (FIG. 7A) as long as they are present in the gamuts. That is, an auxiliary color material maintains an output value higher than those of other color inks. The auxiliary color materials will also be referred to as a warm black tone ink and a cold black tone ink hereinafter.

As shown in FIGS. 7A to 7C, the amounts of the warm black tone ink and cold black tone ink monotonically increase toward the high density region. To print a monochrome image, the warm black tone ink and cold black tone ink are thus used at a predetermined ratio in all density regions defined by the image data. It is consequently possible to avoid monochrome image expression using CMY and thus prevent any color shifts due to faint imbalance of the amounts of the three color inks.

In FIG. 7A, the warm black tone ink and cold black tone ink are used almost half-and-half. The ratio should be adjusted in accordance with the printing medium, as a matter of course, and can change variously. For example, if the paper white is bluish, the warm black tone ink needs to be used in a relatively large amount to generate the pure black tone. In other words, the warm black tone ink and cold black tone ink which enable density drawing from the low density region to the high density region are used, and the pure black tone is generated only by adjusting the use ratio.

In this case, these inks have neither the function of reducing graininess nor the function of a basic color to generate gray while keeping balance between them. Hence, even when the density value changes, the output value only monotonically increases. The amounts of inks never steeply cross each other along with an increase and decrease. Unlike the conventional monochrome mode described with reference to FIGS. 12 and 13, there is almost no concern about color shifts.

Note that the tone characteristic of the warm black tone ink or the cold black tone ink is represented by a line along L* which is linear with respect to the signal value. However, the tone characteristic of L* or the value of luminance γ is not limited to this.

Second Embodiment

In the gamut for monochrome printing and, more particularly, in a gamut for performing only adjustment of the warm black tone and cold black tone, a chromatic color ink for toning is sometimes used in addition to the warm black tone ink or the cold black tone ink.

For example, there are reddish and greenish media among a myriad of printing media (printing paper sheets) in the world. Mixing only the warm black tone ink and cold black tone ink does not suffice for generating the warm black tone or cold black tone ink of a monochrome photo and for generating an ideal pure black tone, either.

In this case, it is necessary to use a chromatic color ink as a toning color material in addition to the warm black tone ink or the cold black tone ink.

In this embodiment, the user can designate the tint of the printing paper sheet on the background using the slider shown at the lowermost position of FIG. 10. For example, when the slider is located at the center, the printing paper sheet on the background has a normal white color. If the printing paper sheet is bluish, the user moves the slider to the right (tint setting).

The image forming apparatus can detect the tint of the printing paper sheet by detecting the position of the slider for tint setting, and determine whether to use a chromatic color ink as a toning color material in addition to the warm black tone ink or the cold black tone ink.

The apparatus also detects the currently set print mode (warm black tone, pure black tone, or cold black tone) based on, for example, the slider at the uppermost position of FIG. 10 and selects one of lookup tables to be described later for use.

Figure 8A:
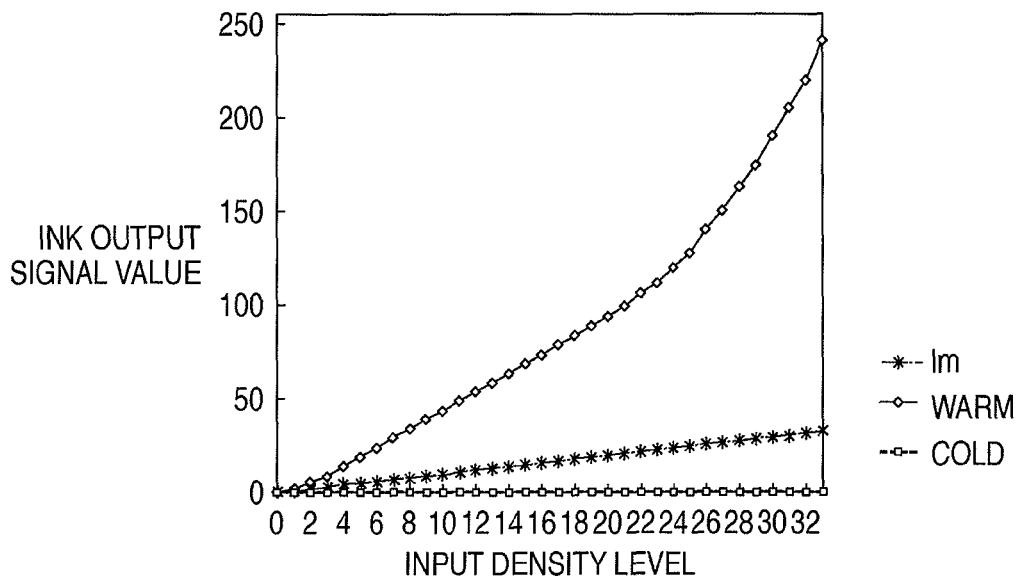
FIGS. 8A and 8B are graphs schematically showing lookup tables when a chromatic color ink is used.
Figure 8B:
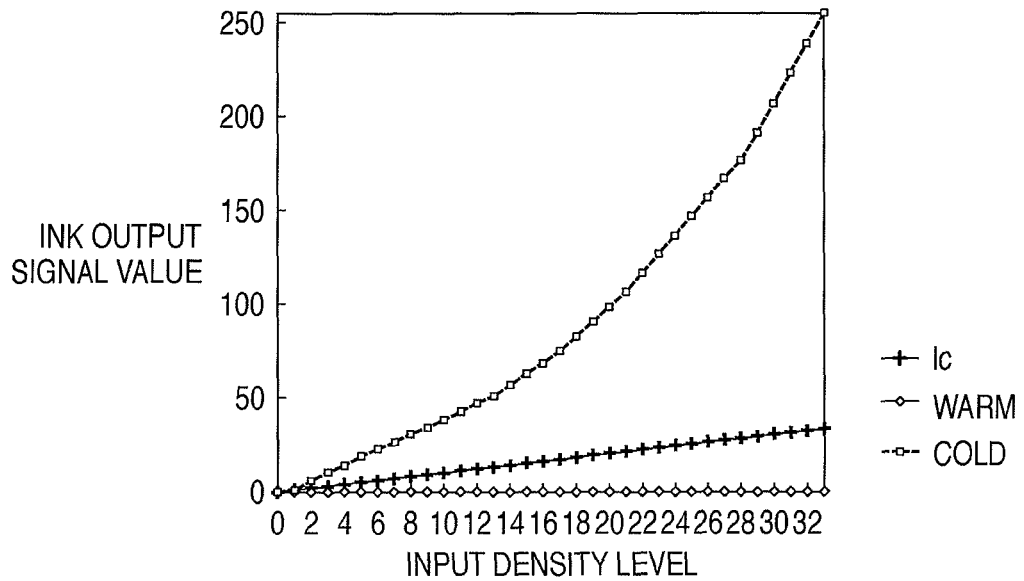

FIG. 8A is a graph schematically showing a lookup table when a chromatic color ink is used as a toning color material in addition to the warm black tone ink. FIG. 8B is a graph schematically showing a lookup table when a chromatic color ink is used as a toning color material in addition to the cold black tone ink.

As shown in FIGS. 8A and 8B, only the warm black tone ink, the cold black tone ink, and a minimum chromatic color ink are used from the low density region to the high density region. The chromatic color inks always maintain their output values at low levels less than the use amounts of the warm black tone ink and cold black tone ink.

More specifically, the chromatic color is used here in, for example, the warm black tone line together with the warm black tone ink to express the hue of the warm black tone. The chromatic color is used to suppress a color shift generated by the property of the warm black tone ink itself used in the gamut (warm black tone line) or its relative property with respect to the printing medium.

On the cold black tone line as well, the chromatic color is used in, for example, the cold black tone line together with the cold black tone ink to express the hue of the cold black tone. The chromatic color is used to suppress a color shift generated by the property of the cold black tone ink itself used in the gamut (cold black tone line) or its relative property with respect to the printing medium.

In this way, a minimum chromatic color ink in a minimum amount is used together with the warm black tone ink or the cold black tone ink. This suppresses any unnecessary color shift in a monochrome photo which is caused by the property of the printing medium when printing a monochrome photo image.

Figure 12:
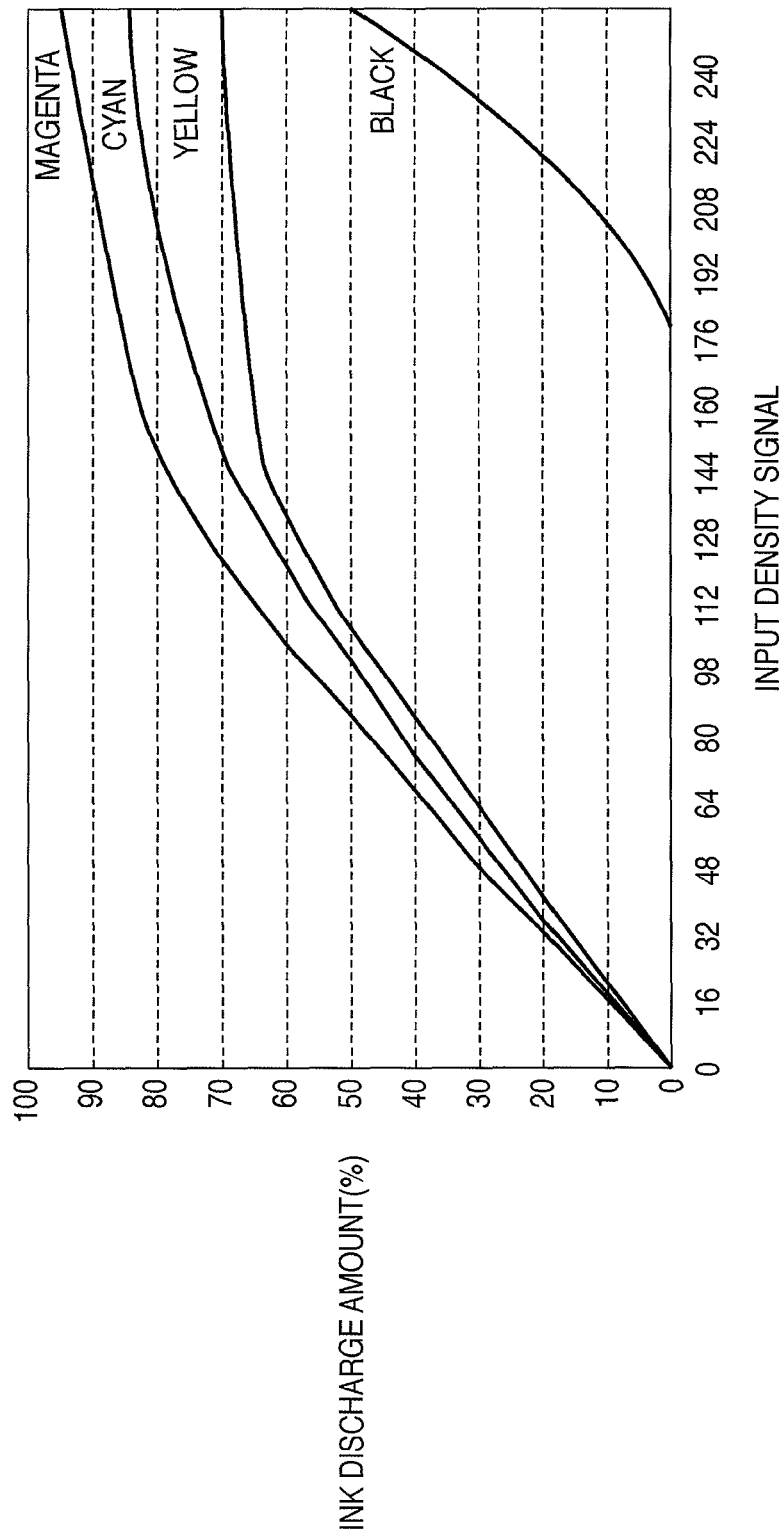
FIG. 12 is a graph for explaining details of a conventional color conversion lookup table to be used to print a gray image.

In the conventional color conversion shown in FIGS. 12 and 13, the signal value of each color does not increase or decrease monotonically, and the colors cross at places. This generates a situation where a color shift readily occurs. Especially, when a printhead whose discharge amount is small is used, as in this embodiment, a color shift occurs more conspicuously. This generates an adverse effect on an image when a stable monochrome image is required, as in the monochrome photo mode.

Note that use of an ink such as the warm black tone ink or the cold black tone ink which can draw tones from the low density region to the high density region may make the graininess worse. However, as described above, when the discharge amount per dot is sufficiently small, and formed dots are rarely perceived at a general distance of distinct vision, as in this embodiment, not the graininess but the "color shift" needs to be taken into consideration as a large adverse effect on an image.

In this embodiment, it is noteworthy that the degree of the adverse effect on an image such as the "graininess" or "color shift" changes depending on the applied ink droplet amount when attaining high photo quality. If the dot size on the printing medium is so small as to be negligible, it is important to suppress not the graininess but the "color shift".

The above-described idea is carried through even for colors (warm black tone and cold black tone) other than the gray axis of the gamut. Even when a tone adjustment function is added, a "color shift" hardly occurs, and it is therefore possible to provide a monochrome photo which maintains high quality.

The size of a dot formed on a printing medium or its conspicuousness changes depending on the tint or property of the printing medium. For this reason, it is not possible to absolutely predicate "how much discharge amount can make the graininess negligible". However, based on judgment of a commonly provided inkjet printer or a printing medium adaptive to it, a discharge amount of 2 ng or less per dot can almost avoid problems, and 1 ng or less is more preferable.

Other Embodiments

An example has been described with reference to FIG. 5, in which only when an image to be printed is estimated to be a photo, that is, only when grayscale printing is selected, prophoto paper is selected as the printing medium, and the "monochrome photo mode" is selected, conversion processing 2 (step S510) is executed. However, this embodiment is not limited to this example.

For example, even when the image to be printed is of a type other than a photo, conversion processing 2 may be enabled as far as grayscale printing is selected. That is, when the monochrome mode is selected to output a grayscale image, conversion processing 2 may be enabled independently of whether the image to be printed is a photo.

According to this arrangement, color shifts can be suppressed not only when the image to be output is a monochrome photo but also for all kinds of grayscale images.

The warm black tone ink and cold black tone ink having the above-described properties are used not only for printing in the monochrome photo mode. They can also be used for color printing effectively.

There is recently growing a need for controlling overall color cast based on an index called a printing color temperature, ranging from a bluish state at a high color temperature to a yellowish state at a low color temperature in color printing. Especially, a low chroma portion near the gray axis requires adjustment of making the color bluish when the color temperature is high or adjustment of making the color yellowish when the color temperature is low by driver setting.

An example of the driver setting UI is the slider shown at the middle position of FIG. 10. The color temperature control can easily be adjusted by simply adding the color material signal values of the warm black tone ink and cold black tone ink to a color separation table (lookup table) represented by default adjustment values in normal color printing.

Figure 11A:
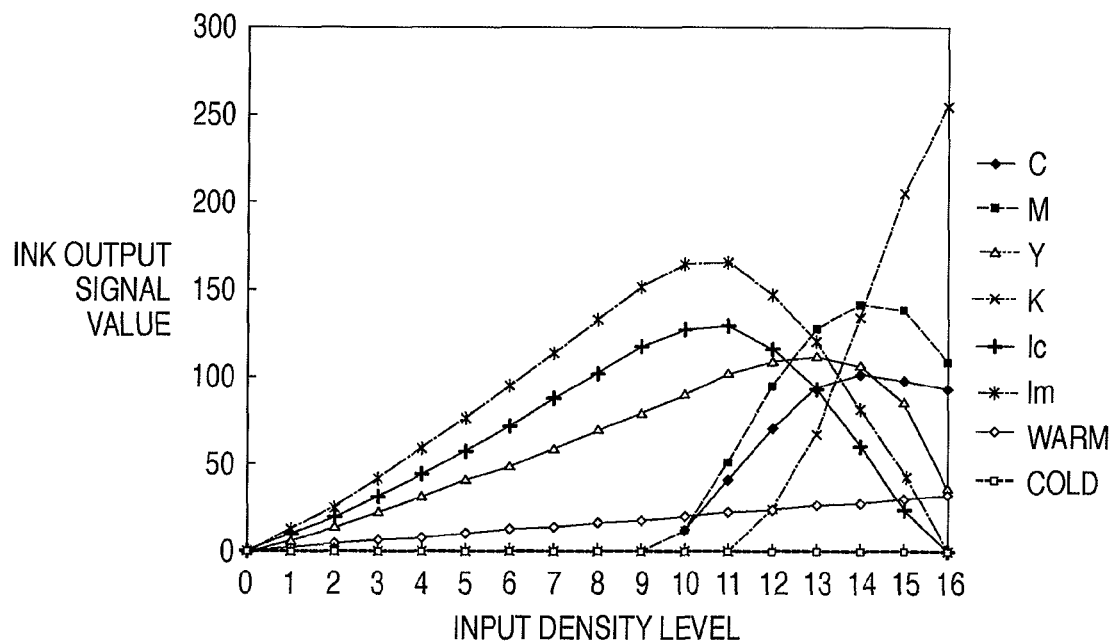
FIGS. 11A and 11B are graphs showing examples of ink use when color temperature adjustment is performed for the gray axis in a color mode.
Figure 11B:
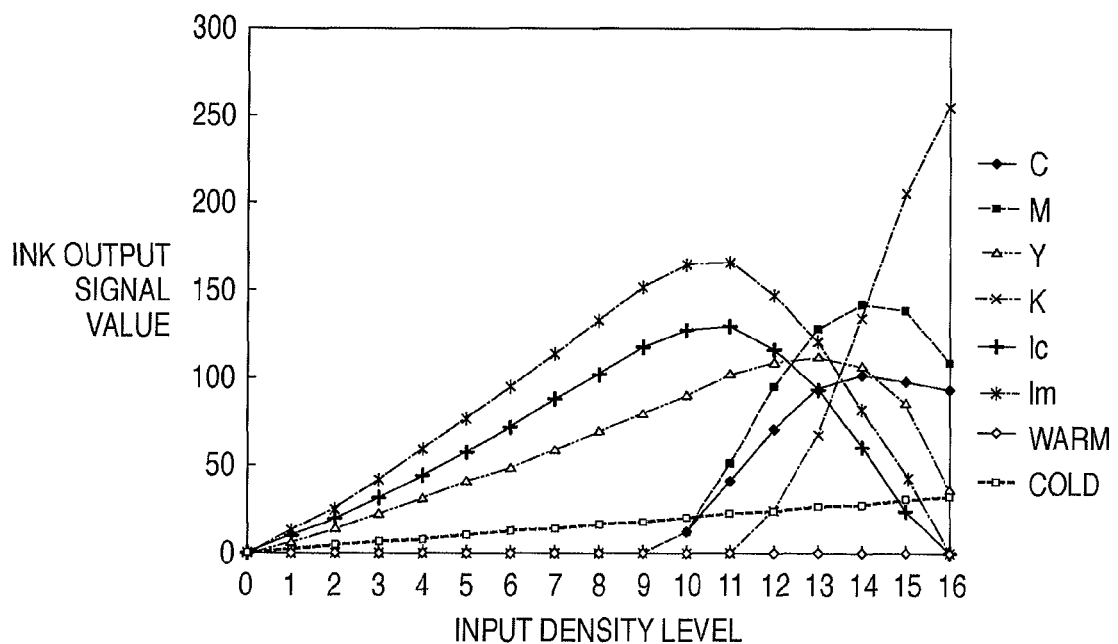

FIGS. 11A and 11B are graphs showing examples of ink use when color temperature adjustment is performed for the gray axis in a color mode. FIG. 11A is a graph (a schematic view of a lookup table) showing ink use amounts when the printing color temperature of the gray axis in the color mode is set to be low (e.g., 3,000 K). FIG. 11B is a graph (a schematic view of a lookup table) showing ink use amounts when the printing color temperature of the gray axis in the color mode is set to be high (e.g., 7,000 K).

The warm black tone ink and cold black tone ink are also usable for tone adjustment of paper white itself. For example, applying the cold black tone ink to a portion without print data of slightly yellowish paper allows to return the paper white to neutral. Conversely, the warm black tone ink is used for slightly bluish paper.

If a color blur has occurred due to a variation in the ink discharge amount from the head, and the color cast makes the overall tone bluish, it is corrected by applying the warm black tone ink. If the color cast makes the overall tone yellowish, it can be corrected by applying the cold black tone ink.

As described above, if imbalance has occurred in the basic chromatic color inks due to a variation in the ink discharge amount at the time of color printing, the warm black tone ink and cold black tone ink can provide a function like calibration.

Dominantly using the warm black tone ink or cold black tone ink has been described with reference to FIGS. 7A to 7C. However, a system capable of incorporating even light inks and medium density inks of the warm black tone ink and cold black tone ink may be formed to dominantly use the warm black tone inks and cold black tone inks of the plurality of densities.

In this case, the property with respect to the density expressed by input image data may tends to monotonically increase. A chromatic color ink only functions to suppress "color shifts". The density value of the chromatic color ink is set to be smaller than the density signal values of the warm black tone ink and cold black tone ink.

In the above-described embodiment, the present invention has been described using the inkjet printing system having the arrangement shown in FIG. 3 as an example. However, the present invention is applicable to any other arrangement. The components shown in FIG. 3 can be provided in either a host computer or an inkjet printer. An image forming system may be formed by integrating all the components shown in FIG. 3. In this case, the image forming system is formed from only an inkjet printer (printing apparatus).

In the above-described embodiment, the CPU 102 of the host computer 101 wholly executes the conversion processing explained with reference to FIG. 4. However, for example, the inkjet printer 107 may perform the processing partially or wholly. Additionally, input and setting of a print mode explained with reference to FIG. 5 may be done on the inkjet printer.

The window for setting a print mode explained with reference to FIG. 6 need not always include the described items. In FIG. 6, the checkbox 83 to select grayscale printing is prepared. Instead, the window may be configured to allow the user himself/herself to set the hue and chroma of an output image on it. When the user has set a predetermined hue and chroma, the CPU may determine that the grayscale mode has been set.

The embodiment has been described using an inkjet printer capable of discharging eight color inks. However, the present invention can effectively be applied not only to the inkjet printer but also any other printing apparatus capable of expressing a color image using a plurality of color materials.

However, the phenomena such as the "color shift", "undesirable color change", and "graininess" are adverse effects on an image which are characteristic to an inkjet printer. Hence, the present invention is especially effective for an inkjet printer. However, the present invention is also applicable to color conversion processing when causing a printing apparatus of electrophotographic scheme using toners as color materials to print a monochrome image, as is apparent from the above description.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-326584, filed Dec. 22, 2008, which is hereby incorporated by reference herein in its entirety.

What is claimed is:

1. An image processing method of forming an image, comprising:
    setting one of a plurality of modes including a monochrome mode and a color mode, wherein the monochrome mode is capable of forming a warm black tone image and capable of forming a cold black tone image and the color mode is capable of forming a color image;
    converting a multivalued luminance signal into signal values for forming the warm black tone image by using a warm black tone ink without using a cyan color ink, a magenta color ink and a yellow color ink in a case where the monochrome mode for the warm black tone image is set;
    converting the multivalued luminance signal into signal values for forming the cold black tone image by using a cold black tone ink without using the cyan color ink, the magenta color ink and the yellow color ink in a case where the monochrome mode for the cold black tone image is set; and
    converting the multivalued luminance signal into signal values for forming the color image by using the cyan color ink, the magenta color ink and the yellow color ink in a case where the color mode is set;
    wherein a color gamut of the warm black tone ink includes an upper right quadrant of an a-b plane in a Lab space, a color gamut of the cold black tone ink includes a lower left quadrant of the a-b plane in the Lab space, and the color gamut of the warm black tone ink and the color gamut of the cold black tone ink have hues that are opposite to each other.

2. The method according to claim 1, wherein the monochrome mode is further capable of forming a pure black tone image, and
    wherein in the converting step, the multivalued luminance signal is converted into signal values for forming the pure black tone image by using the warm black tone ink and the cold black tone ink without using the cyan color ink, the magenta color ink and the yellow color ink.

3. The method according to claim 2, wherein in the converting step, conversion to the signal values for forming the pure black tone image is done to use the warm black tone ink and the cold black tone ink in an equal amount in all density regions of the achromatic axis.

4. The method according to claim 1, wherein conversion to the signal values for forming the color image is done to use at least one of the warm black tone ink and the cold black tone ink for adjusting a color temperature of the color image to be formed in the color mode.

5. The method according to claim 1,
    wherein the warm black tone ink and the cold black tone ink have chroma smaller than that of a color gamut which is expressed by all combinations of the plurality of chromatic color inks including the cyan color ink, the magenta color ink and the yellow color ink.

6. The method according to claim 1, wherein a black color ink different from the warm black tone ink and the cold black tone ink, is used for forming the color image.

7. The method according to claim 1, wherein the warm black tone image, the cold black tone image, and the color image are formed with an ink droplet discharged from an orifice array provided with a print head, wherein the orifice array for discharging the warm black tone ink is different from the orifice array for discharging the cold black tone ink.

8. An image processing system for forming an image, comprising:

a setting unit configured to set one of a plurality of modes including a monochrome mode and a color mode, wherein the monochrome mode is capable of forming a warm black tone image and capable of forming a cold black tone image and the color mode is capable of forming a color image;

a first image processing unit configured to convert a multivalued luminance signal into signal values for forming the warm black tone image by using a warm black tone ink without using a cyan color ink, a magenta color ink and a yellow color ink in a case where the monochrome mode for the warm black tone image is set;

a second image processing unit configured to convert the multivalued luminance signal into signal values for forming the cold black tone image by using a cold black tone ink without using the cyan color ink, the magenta color ink and the yellow color ink in a case where the monochrome mode for the cold black tone image is set; and a third image processing unit configured to convert the multivalued luminance signal into signal values for forming the color image by using the cyan color ink, the magenta color ink and the yellow color ink in a case where the color mode is set;

wherein a color gamut of the warm black tone ink includes an upper right quadrant of an a-b plane in a Lab space, a color gamut of the cold black tone ink includes a lower left quadrant of the a-b plane in the Lab space, and the color gamut of the warm black tone ink and the color gamut of the cold black tone ink have hues that are opposite to each other.

* * * * *